March 22, 1949.    D. M. CONSIDINE    2,465,322
TARGET TUBE FOR RADIATION PYROMETERS
Filed June 23, 1944
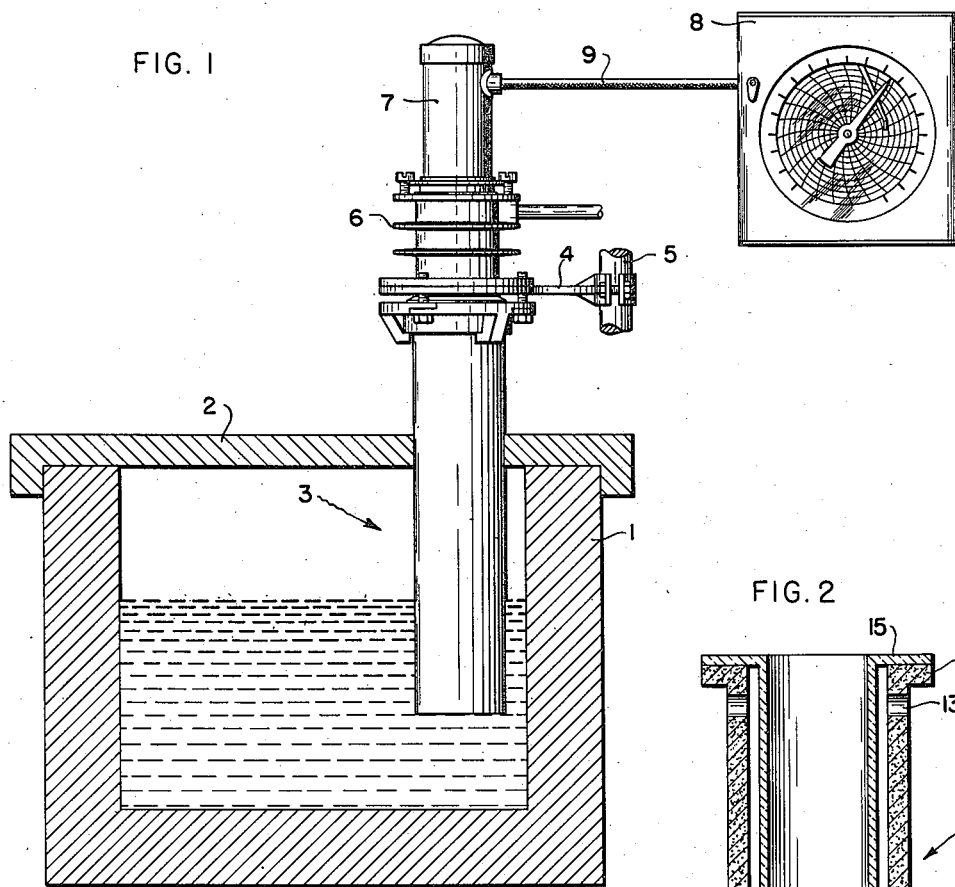
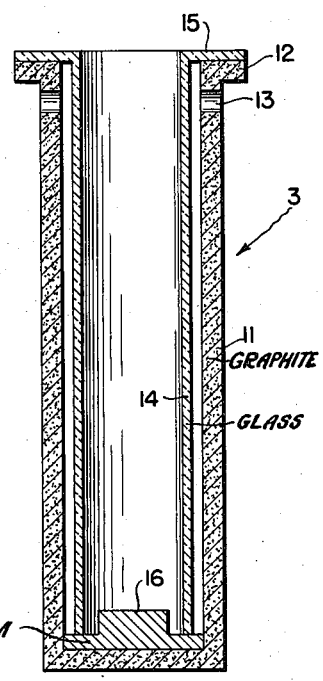
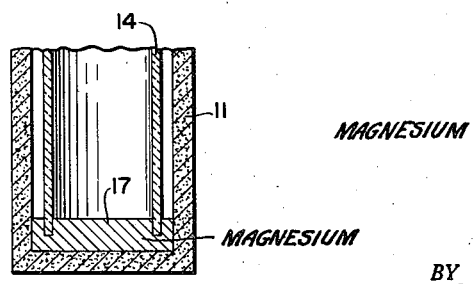
INVENTOR.
DOUGLAS M. CONSIDINE
BY
*C. B. Spangenberg*
ATTORNEY.

Patented Mar. 22, 1949

2,465,322

UNITED STATES PATENT OFFICE 2,465,322

TARGET TUBE FOR RADIATION PYROMETERS

Douglas M. Considine, Philadelphia, Pa., assignor, by mesne assignments, to Minneapolis-Honeywell Regulator Company, Minneapolis, Minn., a corporation of Delaware Application June 23, 1944, Serial No. 541,703

8 Claims. (Cl. 136—4)

1

The present invention relates to radiation pyrometers, and more particularly to target tubes to be used in the measurement of molten metal temperatures with radiation pyrometers.

When measuring the subsurface temperature of a molten metal with a radiation pyrometer it is necessary to use a target tube of some material which will not contaminate the metal. Such a material at the temperature of the molten metal may, however, have a tendency to combine with the air in the target tube to produce an atmosphere that will affect the characteristics of a radiation responsive instrument. It has been common practice to force a stream of air into the target tube to continually purge it. This practice, however, tends to reduce the temperature of the tube so that an incorrect reading will result. These, and other difficulties, have been encountered when it has become necessary to immerse the target tube in the metal bath.

It is an object of the present invention to provide a target tube for use with radiation pyrometers which will overcome the above mentioned difficulties. It is a further object of the invention to provide a target tube, the atmosphere in which cannot become contaminated and thus affect the calibration of a pyrometer attached thereto.

It is a further object of the invention to provide a target tube for use in connection with molten metals or other molten material which will permit a pyrometer used therewith to give a true reading of the temperature of the material being measured. It is also an object of the invention to provide a target tube so constructed that if it is broken, no contamination of the bath in which it was immersed will result.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Figure 1 is a diagrammatic showing of a measuring system for a molten metal bath using the target tube of the invention, Figure 2 is a sectional view of the target tube, and Figure 3 is a view similar to Figure 2 after the target tube has been heated.

For the purposes of this description, the target

2 tube will be described as being used to measure the temperature of a molten magnesium bath. For this reason the target tube will be described as being made of certain materials which do not have any contaminating effect on molten magnesium. When the target tube is used with other metals or substances it will be readily apparent that it will have to be made of materials which will not have any chemical action with the material whose temperature is being measured. In either case, however, the mechanical construction of the target tube will be the same.

There is shown in Figure 1 a furnace or other heater 1 in which the material to be heated is placed. This furnace is provided with a top 2 that has an opening in it through which the target tube indicated generally at 3 is projected to extend beneath the surface of the bath any desired distance. The target tube is held in place by means of a fitting 4 which cooperates with a flange on the tube, which fitting is rigidly attached to a suitable support 5. Also attached to the fitting 4 is an air cooled fitting 6 that has upon its upper end a radiation pyrometer 7. The pyrometer is connected to a potentiometer or other suitable recording instrument 8 by means of a cable 9.

In the operation of a temperature measuring system of this type the target tube is immersed in the bath to any desired depth and the radiation pyrometer 7 is focused on the closed end of the target tube to be responsive to the temperature thereof. As the temperature of the end of the target tube varies, the E. M. F. generated by the pyrometer will vary and this E. M. F. is impressed upon a suitable measuring circuit forming part of the instrument 8. Thereafter, as the temperature of the bath varies, the instrument will make a record thereof. It will be noted that this instrument can, if desired, also be used in any conventional manner to control the temperature of the furnace 1.

The target tube is constructed in a manner which is best shown in the sectional view of Figure 2. When used to measure the temperature of magnesium the target tube is made of an outer tube member 11 of graphite that is formed at its upper end with a flange 12 and which has openings 13 made in it adjacent the flange. Located within the tube 11 is an inner, open ended tube 14, that in this case can be made of a high temperature-resistant glass. This tube has a flange 15 formed on it which rests upon the flange 12 of tube 11 so that the tube 14 can be supported with its lower end slightly above the inner surface of the tube 11. The flange 15 can also be used to center tube 14 with respect to tube 11. There is placed in the bottom of the tube 11 a casting 16 which is made of magnesium upon which the lower end of the tube 14 can rest. This casting has a large enough volume so that when the furnace is heated to a temperature which is sufficient to melt magnesium, the casting will melt and will serve to form a seal between the lower end of the inner tube 14 and the outer tube 11 as best shown at 17 in Figure 3.

When graphite, of which the tube 11 is made, is heated to temperatures at or above the melting point of magnesium it will combine with the oxygen of the atmosphere to form carbon dioxide and carbon monoxide. Because the radiation absorption characteristics of these gases differ from that of the atmosphere, the calibration of the pyrometer will be upset and the readings obtained thereby will be incorrect if the path of the pyrometer is filled with one of these gases. In order to overcome this difficulty the second inner tube 14 is placed within the first tube 11. This latter tube is made of some material that is impervious to gases at the temperatures which are encountered in the particular measuring system being used. In this case it has been found that a high temperature resistant glass is very satisfactory. A seal is necessary between the two tubes so that the interior of tube 14 will only be filled with the normal atmosphere. To this end the casting 16 is placed in the lower end of the tube 11 so that as the bath is brought up to the temperature of molten magnesium, the casting 16 will be melted and will flow as shown in Figure 3 to form a seal between the tubes 11 and 14. Thereafter, during the measuring process, any gases which would affect the calibration of the radiation pyrometer 7 will be confined within the annular space between the two tubes 11 and 14 and may pass out through the openings 13 in the upper part of tube 11. The atmosphere within the tube 14 remains constant.

An added advantage of making the casting 16 of magnesium, which is the same as the material of the bath, is that if for some reason the tube 11 should be broken, the addition of the metal forming the casting to the bath will not have any material effect upon the same. Even if the tube 14 should be of a material which will have some contaminating effect on the magnesium of the bath and would therefore contaminate the metal of which the casting 16 is made, the volume of the casting 16 with respect to the volume of the metal in the furnace 1 would be so small that its effect would be practically negligible. Another advantage of making the casting 16 of the same material as the bath is that the pyrometer is focused on this material and it will have the same emissivity as the bath itself and the temperature will be accurately measured. It is noted that the volume of the material in casting 16 is small enough so that its surface is still below the surface of the bath in the furnace 1, therefore its temperature is substantially equal to the subsurface temperature at the level at which it is desired to measure.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. A target tube for radiation pyrometers including a first outer closed end tube, a second inner open end tube, the tubes being of such a diameter that an annular space is formed between them, and means located in said first tube and adjacent the closed end portion of said first mentioned tube to seal off the lower end of the second mentioned tube, said sealing means comprising a material having an emissivity characteristic approximately the same as that of a medium the temperature of which it is desired to measure and which the outer tube is subjected when the temperature of the medium is to be measured.

2. A target tube for radiation pyrometers including a closed end tube of a material not affected by the medium whose temperature is being measured and adapted to be placed in the medium whose temperature is to be measured, an inner open end tube of a gas impervious material received in telescoped relation to said first mentioned tube with an annular space between the two, the end of said second mentioned tube terminating adjacent the closed end of said first mentioned tube, and means located in the closed end of said first tube to seal off the interior of said second mentioned tube from said annular space, said sealing means comprising a body of metal having a melting point lower than that of either of said tubes and having an emissivity characteristic approximately the same as that of the medium whose temperature is to be measured.

3. A target tube for pyrometers comprising an outer tube having an open end and a closed end, a flange on said tube projecting outwardly from said open end, an inner tube having both ends open and adapted to be inserted in said outer tube, a flange projecting outwardly from one end of said inner tube and being adapted to rest on the flange of said outer tube to position said two tubes relative to each other, the opposite end of said inner tube terminating just short of the closed end of said outer tube, and means in the closed end of said outer tube and extending beyond the adjacent end of said inner tube to seal off the end of the latter, said sealing means comprising a body of metal having a melting point lower than that of either of said tubes and having an emissivity characteristic approximately the same as that of a medium to which the outer tube is subjected and the temperaure of which it is desired to measure.

4. A target tube for radiation pyrometers in measuring the temperatures of molten metal comprising an outer closed end tube projecting into the metal, an inner open tube received by said outer tube with the open end of the inner tube adjacent the closed end of the outer tube, and a seal for said open end comprising a body of metal of the same kind as the metal whose temperature is being measured located in the closed end of said first mentioned tube and extending to a depth above the open end of said second mentioned tube, said seal having a melting point lower than that of either of said tubes.

5. A target tube for radiation pyrometers used in measuring the temperature of molten metal comprising a closed end outer tube of a material that is inactive chemically with respect to the metal, an open end tube of a gas impervious material inserted in telescoped relation to said first mentioned tube with its open end adjacent the closed end of said first mentioned tube, said tubes being of such a diameter that an annular space is formed between them, and means adjacent the closed end of said outer tube to seal off the annular space from the interior of said second mentioned tube comprising a body of the same kind of metal as the metal whose temperature is being measured, said sealing means having a melting point lower than that of either of said tubes.

6. A target tube for radiation pyrometers including a closed end tube of a material capable of withstanding the action of the material whose temperature is being measured, an open end tube of a gas impervious material received in telescoped relation by said first mentioned tube with the open end of the second tube adjacent the closed end of the first tube, said tubes being of such a diameter that an annular space is formed between them, said tubes being so formed at their opposite ends that said annular space is closed, and a body of material in the closed end of said first mentioned tube and extending to such a depth that the open end of said second mentioned tube is sealed off from said annular space, said body of material having an emissivity characteristic approximately the same as that of the material whose temperature is being measured, said first mentioned tube being formed with an opening adjacent the end opposite its closed end to vent said annular space.

7. A target tube for radiation pyrometers used in the measurement of molten magnesium temperatures comprising an outer closed end tube of graphite to be immersed in a bath of molten magnesium, an inner open end tube of heat resisting glass mounted in telescoped relation with said graphite tube so that the open end of the glass tube is adjacent the closed end of the graphite tube, said tubes being of such diameters that an annular space is formed between them, and a body of magnesium in the closed end of the graphite tube and of such a depth that it acts to seal the interior of the glass tube from said annular space.

8. A target tube for radiation pyrometers including a first outer closed end tube, a second inner open end tube, the tubes being of such a diameter that an annular space is formed between them, and means located in said first tube and adjacent the closed end portion of said first tube to seal off the lower end of the second mentioned tube, said sealing means comprising a material having an emissivity characteristic approximately the same as that of a medium the temperature of which it is desired to measure and to which the outer tube is subjected and which will not contaminate said medium if the first outer closed end tube should be broken.

DOUGLAS M. CONSIDINE.

REFERENCES CITED

The following references are of record in the file of this patent:

UNITED STATES PATENTS

| Number | Name | Date |
|---|---|---|
| 1,318,516 | Wallis et al. | Oct. 14, 1919 |
| 1,894,109 | Marcellus | Jan. 10, 1933 |
| 2,102,955 | Hulme | Dec. 21, 1937 |
| 2,177,046 | Sweo | Oct. 24, 1939 |
| 2,303,704 | Oseland | Dec. 1, 1942 |
| 2,343,242 | Richmond | Mar. 7, 1944 |